United States Patent
Zibold et al.

(10) Patent No.: US 9,594,182 B2
(45) Date of Patent: Mar. 14, 2017

(54) CAPACITIVE POSITIONING DEVICE

(71) Applicant: Robert Bosch GmbH, Stuttgart (DE)

(72) Inventors: Tobias Zibold, Stuttgart (DE); Andrej Albrecht, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 14/389,255

(22) PCT Filed: Feb. 14, 2013

(86) PCT No.: PCT/EP2013/052918
§ 371 (c)(1),
(2) Date: Sep. 29, 2014

(87) PCT Pub. No.: WO2013/143760
PCT Pub. Date: Oct. 3, 2013

(65) Prior Publication Data
US 2015/0091589 A1    Apr. 2, 2015

(30) Foreign Application Priority Data
Mar. 29, 2012 (DE) .......................... 10 2012 205 126

(51) Int. Cl.
*G01V 3/08* (2006.01)
*G01B 7/00* (2006.01)

(52) U.S. Cl.
CPC ............. *G01V 3/088* (2013.01); *G01B 7/003* (2013.01)

(58) Field of Classification Search
CPC ................................ G01B 7/003; G01V 3/088
USPC ................................. 324/67, 660–663, 679
See application file for complete search history.

(56) References Cited

U.S. PATENT DOCUMENTS

| | | | | |
|---|---|---|---|---|
| 5,917,314 A | * | 6/1999 | Heger ................... | G01B 7/003 324/67 |
| 7,116,091 B2 | * | 10/2006 | Miller ................... | G01V 3/088 324/658 |
| 2010/0148802 A1 | * | 6/2010 | Uchida ................ | G01D 5/2415 324/661 |

FOREIGN PATENT DOCUMENTS

| | | |
|---|---|---|
| DE | 10 2007 058 088 A1 | 6/2009 |
| DE | 10 2008 005 783 A1 | 7/2009 |
| WO | 2005/111663 A1 | 11/2005 |

OTHER PUBLICATIONS

International Search Report corresponding to PCT Application No. PCT/EP2013/052918, mailed Jun. 5, 2013 (German and English language document) (7 pages).

* cited by examiner

*Primary Examiner* — Jay Patidar
(74) *Attorney, Agent, or Firm* — Maginot, Moore & Beck LLP

(57) ABSTRACT

A positioning device for capacitively detecting an object enclosed in a medium includes a measuring electrode, a receiving electrode, and a reference capacitance. The measuring electrode and the receiving electrode form a measuring capacitance that can be influenced by the object and the reference capacitance cannot be influenced by the object. The electrodes are disposed in a plane, and the device includes a spacer that is configured to keep the electrodes at a predetermined minimum distance from the surface of the medium. The predetermined minimum distance is different from zero.

9 Claims, 5 Drawing Sheets

CAPACITIVE POSITIONING DEVICE

This application is a 35 U.S.C §371 National Stage Application of PCT/EP2013/052918, filed on Feb. 14, 2013, which claims the benefit of priority to Ser. No. DE 2012 205 126.0, filed on Mar. 29, 2012 in Germany, the disclosures of which are incorporated herein by reference in their entirety.

BACKGROUND

The disclosure realtes to a locating appliance. In particular, the disclosure relates to a locating appliance for the capacitive detection of an object encloses in a medium.

In order to sense an article concealed in a wall, for example a beam in a wall of lightweight construction, capacitive detectors are known. Such detectors use an electrode that has its charging or discharge behavior determined in order to infer the dielectric object. Detectors having a plurality of electrodes are also known, which involve determining a change in the capacitance of a pair of electrodes. Usually, it is necessary for such detectors to be calibrated manually on the wall, since the appliances cannot detect wall contact themselves and the capacitance of the electrodes or electrode pairs is dependent on ambient conditions, such as a temperature, a humidity, an object averted from the sensor, grounding via a user or electrical or dielectric properties of the wall material. In order to take account of these variable influencing factors, it is necessary for known appliances to be calibrated on the wall, which requires either appropriate control by a user or a complex sensor system.

DE 10 2007 058 088 A1 shows a sensor for locating dielectric objects in a medium. The sensor shown determines a ratio between a reference capacitance and a measurement capacitance, the latter being dependent on the position of the object in relation to electrodes of the two capacitances.

DE 10 2008 005 783 B4 shows a capacitive detector as a crash protection system that uses a push-pull measurement bridge to compare the capacitance of two capacitances with one another. One of the capacitances is formed by two electrodes that can be positioned relative to one another, so that a change in their relative interval can be used to generate a signal that warns of crashing.

The disclosure is based on the object of specifying a locating appliance for capacitive detection that does not require calibration in order to attain a high level of measurement accuracy.

SUMMARY

The disclosure achieves this object by means of a locating appliance having the features of the disclosure. Subclaims reproduce preferred embodiments.

There are essentially two reasons for requiring calibration of the locating appliance. Firstly, uncontrollable influences, such as an ambient temperature, an ambient humidity, an object averted from the sensor or grounding of the locating appliance via a user, can influence the output signal. Secondly, the output signal differs, regardless of the object against a medium, from an output signal in air, with a material and a material thickness of the medium and also electrical wall properties, such as a dielectric constant or a conductivity, being able to be included in the output signal.

An inventive locating appliance for the capacitive detection of an object enclosed in a medium comprises a measurement electrode, a reception electrode and a reference capacitance, wherein the measurement electrode forms, with the reception electrode, a measurement capacitance that can be influenced by the object, and the reference capacitance cannot be influenced by the object. The electrodes are arranged in a plane and a spacer is provided in order to hold the electrodes at a predetermined minimum distance, other than zero, from the surface of the medium.

The reception electrode is preferably ungrounded.

In a preferred embodiment, the reference capacitance is formed from a reference electrode and the reception electrode.

The locating appliance provides an output signal which indicates the presence of the object. However, the output signal preferably depends not only on the presence or absence of an object but also on the distance between the locating appliance and the medium or on electrical and dielectric properties of the medium.

In one embodiment, the locating appliance comprises an evaluation circuit for providing an output signal on the basis of a ratio between the measurement capacitance and the reference capacitance.

In a first variant, the minimum distance is therefore chosen such that the output signal is at a minimum when the locating appliance is placed on the medium. The minimum distance is therefore chosen such that the output signal is smaller than for other distances of the locating appliance from the medium, in particular also such distances that are smaller than the minimum distance. In the mathematical sense, this is therefore a local minimum of the amount of the output signal.

The minimum distance defined in this way may depend primarily on a geometry of the electrodes used and be easily determinable empirically. By placing the electrodes at a distance from the medium at which the output signal is at a minimum, the locating appliance can be almost independent of electrical or dielectric properties of the medium. In particular, the locating appliance becomes independent of minor changes in the distance of the locating appliance from the medium, such as are virtually unavoidable when the locating appliance is moved on the medium by tilting or as a result of rough surfaces.

In a second variant, the output signal may qualitatively behave oppositely as a function of the distance, so that the output signal is at a maximum when the locating appliance is placed on the wall. Here, too, the spacer allows the dependence of the measured value on electrical or dielectric properties of the medium and minor changes in distance of the locating appliance from the medium to be avoided.

The locating appliance may be set up to determine the measurement signal on the basis of a quotient of a difference and a sum respectively of the measurement capacitance and the reference capacitance. Different approaches for such evaluation circuits are known and can be used for the locating appliance. These include, for example, a bridge measurement circuit with a feedback amplifier.

In a particularly preferred embodiment, the evaluation circuit is formed on the principle of the push-pull measurement bridge and comprises an oscillator for supplying the measurement capacitance and the reference capacitance with phase-shifted AC voltages, a control device for controlling the amplitude of at least one of the AC voltages and also a determining device for providing a control signal for the control device in order to match the influences of electrical fields from the measurement electrode and the reference electrode respectively on the reception electrode to one another. In this case, the output signal is provided on the basis of the control signal.

By combining the benefits described above with the advantages of a push-pull measurement bridge, a locating appliance for which the type of construction or the measuring principle already takes account of many of the usual disturbing influences can be provided. As a result, a simple, robust and accurate locating appliance can be provided.

In one embodiment, the measurement electrode, the reference electrode and the reception electrode are situated in one plane and a shielding electrode that at least partially covers the electrodes mentioned and is connected to a constant potential is arranged on a side that is averted from the object. This allows an influence of an object that is averted from the side of the medium, for example a user holding the locating appliance, to be reduced.

The locating appliance may comprise a housing, wherein the spacer is integrated in the housing. In particular, the electrodes may be situated within the housing at a predetermined distance from the housing. This allows reliable avoidance of an operating error being caused by too small a distance between the electrodes and the medium.

In a particularly preferred embodiment, the minimum distance between the electrodes and the medium that is provided by the spacer is at least 5 mm. Tests have shown that, with an arrangement of electrodes of the usual size and relative positioning, the minimum distance mentioned can to a great extent lead to the aforementioned advantages.

BRIEF DESCRIPTION OF THE DRAWINGS

The disclosure is now described more precisely with reference to the appended figures, in which.

DETAILED DESCRIPTION

Figure 1A:
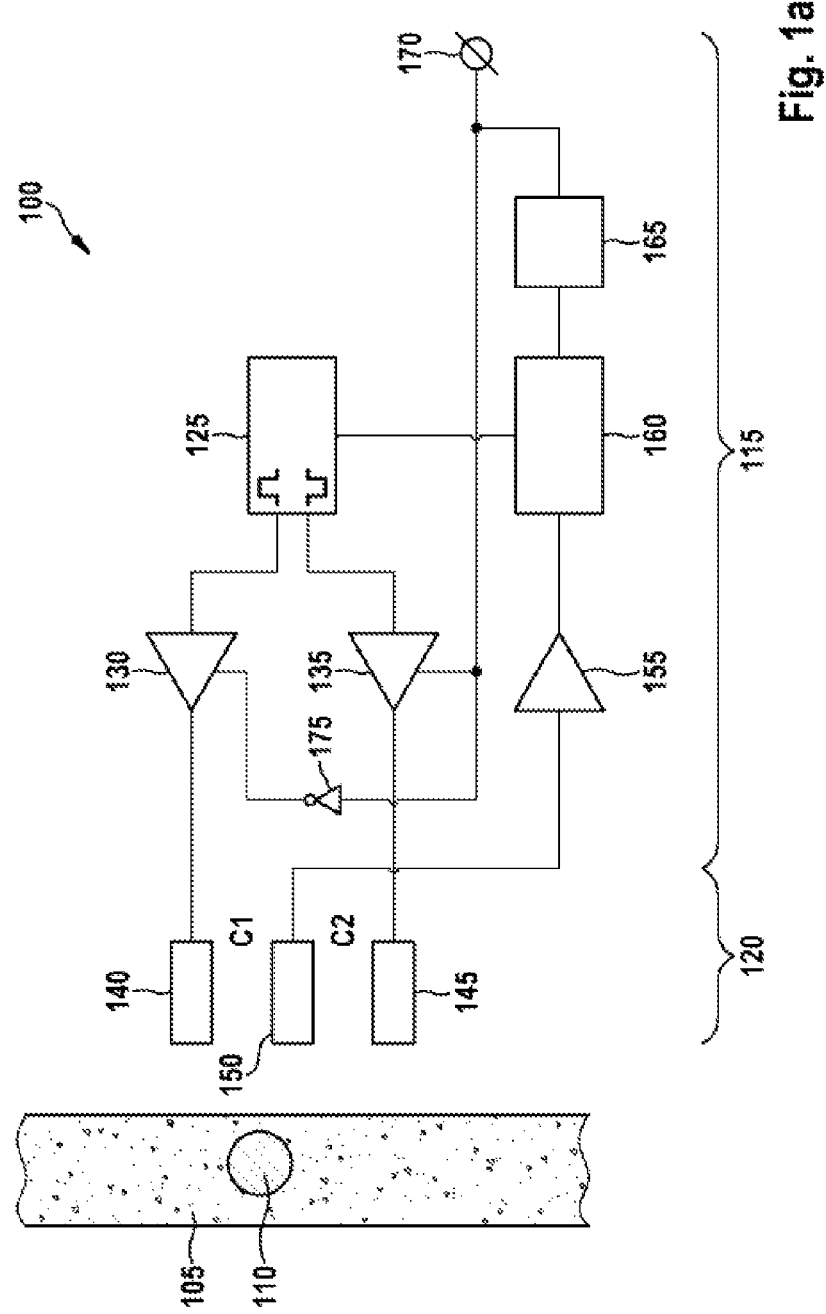
FIG. 1a shows a locating appliance with a first evaluation circuit.

FIG. 1A shows a locating appliance 100 for the capacitive detection of an object 110 enclosed in a medium 105.

The locating appliance 100 comprises a push-pull measurement bridge 115 and an arrangement 120 of electrodes.

An oscillator 125 provides two phase-shifted AC voltages, preferably in antiphase, at the same frequency on the measurement bridge 115. The two AC voltages are routed to two amplifiers 130 and 135, at least one of which can have its gain factor controlled by means of a signal. The output of the first amplifier 130 is connected to a measurement electrode 140 and the output of the second amplifier 135 is connected to a reference electrode 145.

The arrangement 120 comprises at least the electrodes 140 and 145 and also a ground-free reception electrode 150. The electrodes 140, 145 and 150 are arranged relative to one another such that a measurement capacitance C1 becomes established between the measurement electrode 140 and the reception electrode 150 and a reference capacitance C2 becomes established between the reference electrode 145 and the reception electrode 150. In this case, the electrodes 140, 145 and 150 are designed such that the measurement capacitance C1 can be influenced by the object 110, whereas the reference capacitance C2 cannot, or can to a negligibly small extent.

The reception electrode 150 is connected to a measurement amplifier 155, the output of which is connected to a synchronous demodulator 160. On the basis of a clock signal that is provided by the oscillator 125 and the frequency of which corresponds to that of the AC voltages that are provided for the amplifiers 130 and 135, the influences of the measurement electrode 140 and the reference electrode 145 on the reception electrode 150 are determined at alternate times and provided for an integrator 165, which may be in the form of an integrating comparator, for example. An output of the integrator 165 is connected to an interface 170 at which a measurement signal is provided. Furthermore, the measurement signal is used to control the gain factors of at least one of the amplifiers 130 and 135. If both amplifiers 130, 135 are controllable, an inverter 175 is provided in order to control the gain factors in opposite directions.

The push-pull measurement bridge 115 is set up to apply AC voltages to the measurement electrode 140 and the reference electrode of the arrangement 120 such that the effect of a dielectric influence of the object 110 on the capacitances C1 and C2 at the reception electrode 150 is of equal magnitude. In this case, the reference capacitance C2 is of a physical design such that it cannot or practically cannot be influenced by the object 110. If the object 110 is situated asymmetrically in the region of the electrodes 140, 145, for example, so that the capacitances C1 and C2 are influenced by the object 110 dielectrically to different degrees, the AC voltages have unequally high amplitudes, so that the influences of the measurement electrode 140 and the reference electrode 145 on the reception electrode 150 are the same on average over time. The measurement signal provided at the interface 170 reflects the modulation of the amplifiers 130, 135. If the measurement signal is higher or lower than a predetermined value that corresponds to a nonexistent object 110, it is possible to infer the object 110 from the measurement signal.

Figure 1B:
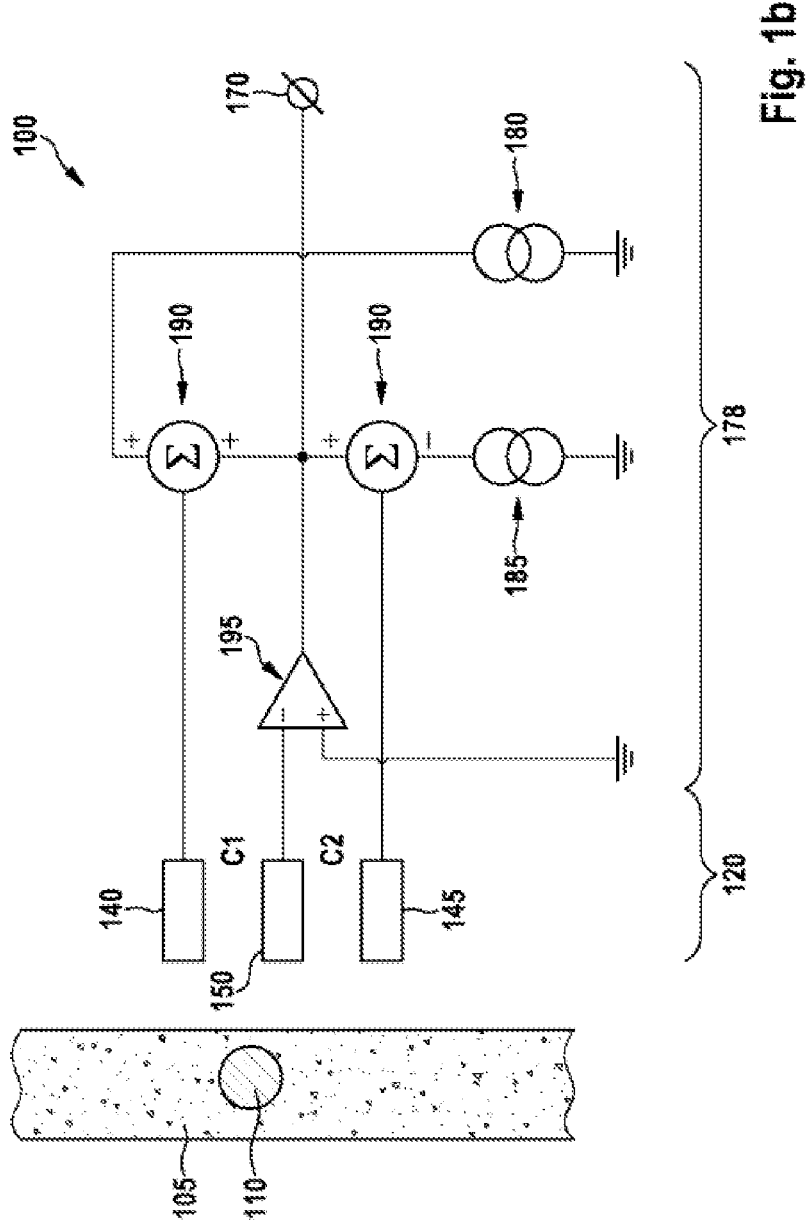
FIG. 1b shows a locating appliance with a second evaluation circuit.

FIG. 1B shows a locating appliance 100 as shown in FIG. 1A, but where the push-pull measurement bridge 115 has been replaced by a bridge measurement circuit 178 with a feedback amplifier.

The measurement electrode 140 is supplied with an AC voltage from a first AC voltage source 180 and the reference electrode 145 is supplied with a second AC voltage from a second AC voltage source 185. The voltages provided by the AC voltage sources 180 and 185 are in antiphase with respect to one another and have the same amplitudes.

The AC voltages from the AC voltage sources 180 and 185 each have an output signal from an amplifier 195 mixed with them by means of a mixer 190, the inverting input of said amplifier being connected to the ground-free reception electrode 150. The output signal from the amplifier 195 and the AC voltage from the first AC voltage source 180 are both mixed together with positive arithmetic signs and forwarded to the measurement electrode 140. For the reference electrode 145, the lower mixer 190 likewise mixes the output signal from the amplifier 195 positively, but mixes the AC voltage from the second AC voltage source 185 negatively, and forwards them to the reference electrode 145.

As a result, the measurement electrode 140 and the reference electrode 145 have AC voltages in antiphase applied to them, the amplitudes of which, in a similar manner to at the push-pull measurement bridge 115 shown in FIG. 1, are controlled such that the influences of electrical fields from the electrodes 140 and 145 on the object 110 correspond to one another. The interface 170 is provided with an AC voltage that indicates the object 110 when it exceeds a predetermined value. In this case, the signal applied to the interface 170 is proportional to a quotient of the difference and the sum of the capacitances C1 and C2. The advantage of the circuit shown is that in the stabilized case the reception electrode 150 is at ground in terms of AC voltage and therefore no alternating currents flow between the reception electrode 150 and ground planes.

Figure 2A:
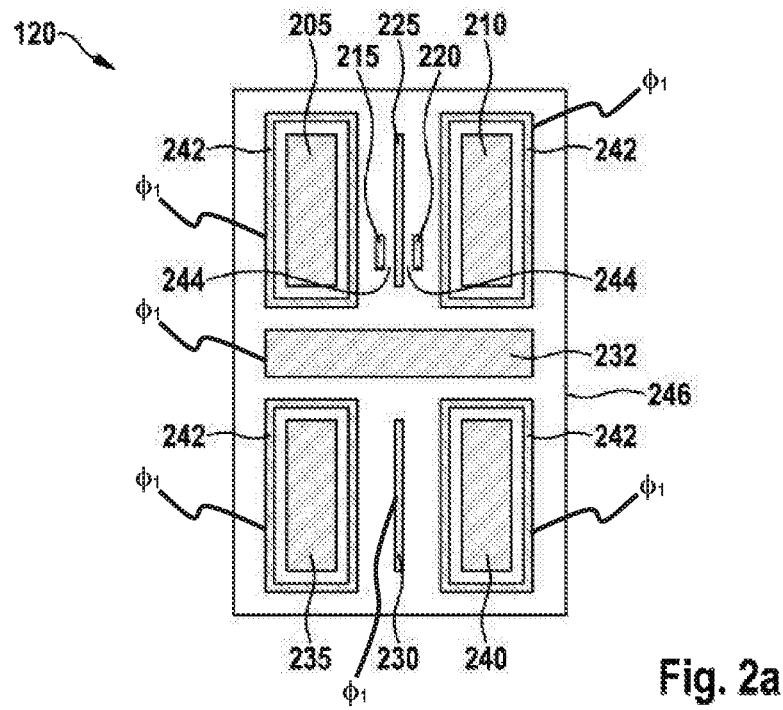
FIG. 2 shows an arrangement of electrodes for the locating appliances in FIGS. 1 and 2.
Figure 2B:
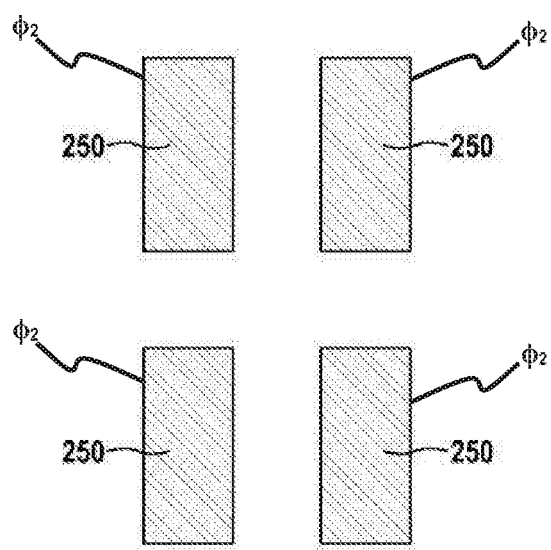

FIG. 2 shows the arrangement 120 of electrodes for the locating appliance 100 from FIG. 1. In this case, FIG. 2A shows electrodes in a first plane, which faces the object 110, and FIG. 2B shows an arrangement of electrodes in a second plane, which is averted from the object 110 in relation to the first plane. In practice, the arrangement shown may be in the form of a printed circuit on different layers of a board made of insulating material, for example.

In FIG. 2A, the first plane contains a first measurement electrode 205 and a second measurement electrode 210, which each correspond to the measurement electrode 140 in FIG. 2, a first reference electrode 215 and a second reference electrode 220, which each correspond to the reference electrode 145 from FIG. 1, and a reception electrode 225, which corresponds to the reception electrode 115 from FIG. 1, and a guard electrode 242. Mutually corresponding electrodes 205 and 210, 215 and 220 may be electrically connected to one another at low impedance. In another embodiment, mutually corresponding electrodes 205-220 have signals applied to them that are the same or not the same but proportional to one another and that may come from different sources. For this purpose, a dedicated amplifier 130 may be provided in the measurement bridge 115 from FIG. 1 for each of the measurement electrodes 205 and 210, for example. Each of the duplicate electrodes 205 and 210, 215 and 220 may also be in single form.

Optionally, the arrangement 120 furthermore contains a first opposing electrode 235 and possibly also a second opposing electrode 240. The measurement electrodes 205, 210 and the opposing electrodes 235, 240 are preferably at the same magnitude and are arranged horizontally and vertically at intervals of the same magnitude from one another. The measurement electrodes 205 and 210 and also the opposing electrodes 235 and 240 may each be surrounded by a guard electrode 242.

Approximately in the center of FIG. 2a there runs a guard electrode 232 in a horizontal direction, isolating the measurement electrodes 205 and 210 arranged at the top, the respective associated guard electrodes 242, the reference electrodes 215 and 220 and the first reception electrode 225 from the opposing electrodes 235 and 240 arranged at the bottom with their associated guard electrodes 242 and the further guard electrode 230. That portion of the arrangement 120 that is situated below the horizontal guard electrode 232 in FIG. 2A can also be omitted in other embodiments.

All of the guard electrodes 230, 232, 242 are optional. The guard electrodes 242 are used to interrupt capacitive couplings between electrodes 205-225, 235, 240 situated in the first plane. The guard electrode 230 corresponds to the reception electrode 150 and increases the symmetry of the electrode arrangement and hence of the field line distribution. The guard electrodes 230, 232, 242 are connected to a predetermined potential $\phi_1$, particularly one that is constant over time, for example to an appliance ground of the locating appliance 100 from FIG. 1. This approach differs from known active shielding in that the potential $\phi_1$ of the guard electrodes is constant over time and is not tracked to another potential. The guard electrodes 230, 232, 242 are particularly suitable when the push-pull measurement bridge 115 shown in FIG. 1 is used, since the measurement bridge 115 is set up to adjust the potential on the reception electrode 150 such that AC voltage components that are in sync with the clock of the AC voltages on the measurement electrode 140 and the reference electrode 145 disappear.

Insulation between adjacent electrodes in the first plane can also be provided by means of air by virtue of a recess 244 being introduced between the electrodes, as shown by way of example between the first reference electrode 215 and the first reception electrode 225 and between the second reference electrode 220 and the first reception electrode 225.

In the preferred embodiment shown, all of the electrodes 205-242 of the arrangement 120 are covered by an insulating layer 246 in order to hamper resistive coupling to the medium 105 of the ambient air or to another object. The insulating layer is also used as a moisture barrier, so that moisture, for example from the air, cannot get into the support material and influence the capacitances.

FIG. 2B shows four shielding electrodes 250, which are each proportioned and positioned such that they cover one of the measurement electrodes 205, 210 or one of the opposing electrodes 235, 240 together with the possibly associated guard electrode 242. The shielding electrodes 250 are connected at the locating appliance 100 to a potential $\phi_2$ that is constant over time and that may correspond to an appliance ground of the locating appliance 100. In addition or alternatively, the shielding electrodes 250 may be connected to the guard electrodes 242. The shielding electrodes 250 may also be protected from external influences by means of an insulating layer 246—not shown.

Figure 3:
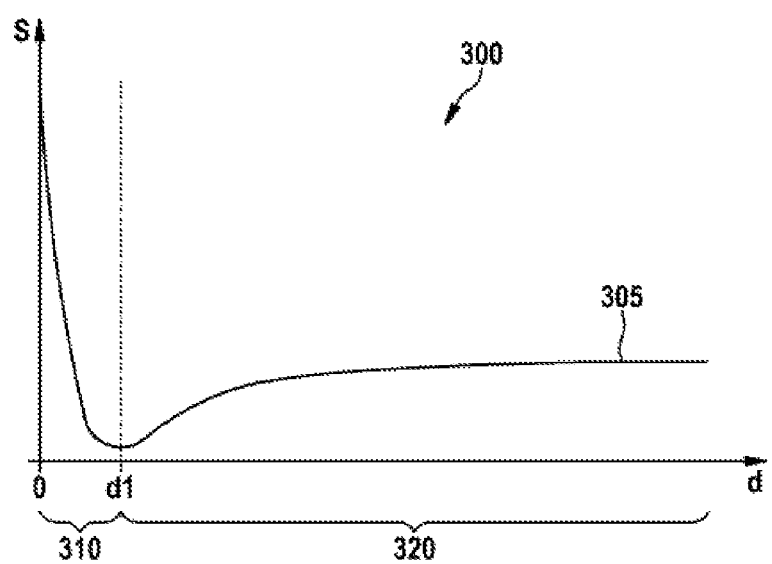
FIG. 3 shows a characteristic curve of an output signal from one of the evaluation circuits in FIGS. 1a and 1b.

FIG. 3 shows a graph 300 of an output signal of one of the evaluation circuits 115 and 178 of FIGS. 1a and 1b with an arrangement 120 of electrodes such as that described above with reference to FIG. 2. The graph 300 applies generally to capacitive sensors with groundless electrodes. In a horizontal direction, a distance between the medium 105 and the arrangement 120 of electrodes is shown and in a vertical direction an output signal S provided at the interface 170 is shown.

A characteristic curve 305 qualitatively represents the relationship between the output signal S and the distance d independently of whether an object 110 is present in the region of the arrangement 120 and what influence the object 110 has on the output signal S as a result of its position, size and dielectric properties. If the distance d is zero, the output signal S is great.

With increasing distance d, the output signal S falls, initially steeply and later flatter, until at a distance d1 it reaches a minimum. With further increasing distance d beyond the distance d1, the output signal S increases and in the further progression closely follows a predetermined value of the output signal S.

The characteristic curve 305 comes about by two effects that are dependent on the distance d acting oppositely on the output signal S. With reference to the evaluation circuits 115 and 178 of FIGS. 1a and 1b, it is assumed that the following applies:

$$S \approx \frac{C1 - C2}{C1 + C2} \qquad \text{(Formula 1)}$$

Expressed in words, the output signal S is proportional to a quotient of the difference and the sum of the measurement capacitance C1 and the reference capacitance C2. In this case, the measurement capacitance C1 is formed by the measurement electrode 140 and the reception electrode 150 and the reference capacitance C2 is formed by the reference electrode 145 and the reception electrode 150.

A first effect, which acts in particular in the case of relatively small distances d, brings about a decrease in the sensor signal S by a decrease in the capacitance between the measurement electrode and the reception electrode or the reference electrode and the reception electrode. As a result, a current between the electrodes 140 or 145 and the reception electrode 150 is reduced and the sensor signal becomes smaller with increasing distance d.

By a second effect, which acts in particular in the case of relatively great distances d, a capacitance between the electrodes 140, 145 and 150 and the medium 105 increases with increasing distance d. This leads to an increase in the current between the measurement electrode 140 and the reception electrode 150 or the reference electrode 145 and the reception electrode 150, whereby the output signal S becomes greater.

The two effects occur concurrently, so that qualitatively the characteristic curve 305 with a minimum sensor signal S at the distance d1 is obtained. It is therefore of advantage to use a spacer to keep the arrangement 120 of electrodes at a distance d of the second portion 320. Particularly preferably, the spacer is set up for fixing the distance d at d1, which is the case for electrodes 140 to 150 of usual dimensions and arrangements in the range of about 3-10 mm, in particular at about 5 mm.

The minimum distance may depend on several geometrical properties of the electrodes. The greater the distance between the measurement electrode and the reception electrode, the greater the minimum distance usually is. Similarly, the minimum distance may depend on the presence of a guard electrode between the measurement electrode and the reception electrode. The presence of a guard electrode may increase the minimum distance. In tests, the following values of the minimum distance were determined as a function of the electrode distance for electrode configurations with a guard electrode:

| Distance of the measurement electrode from the reception electrode [mm] | Minimum distance of the electrodes from the object [mm] |
|---|---|
| 2.1 | 5.5 |
| 5 | 8.1 |
| 9 | 9.9 |

Figure 4A:
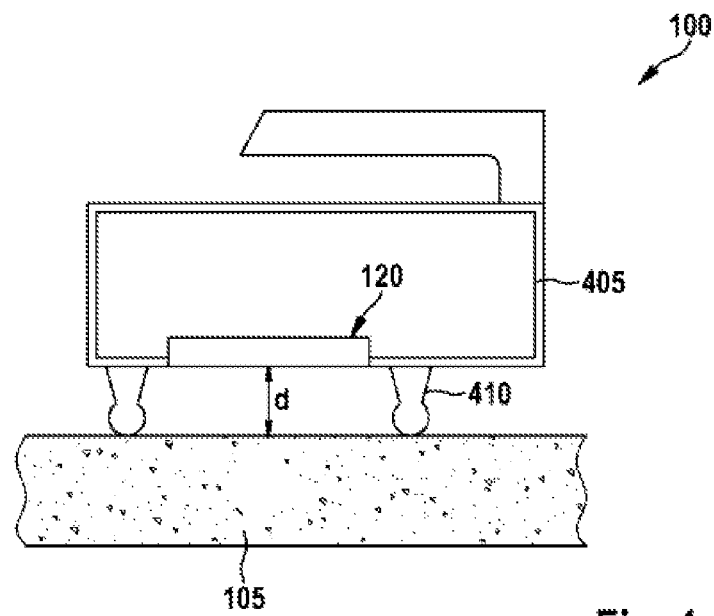
FIG. 4 shows a locating appliance according to FIG. 1a or 1b with different spacers.
Figure 4B:
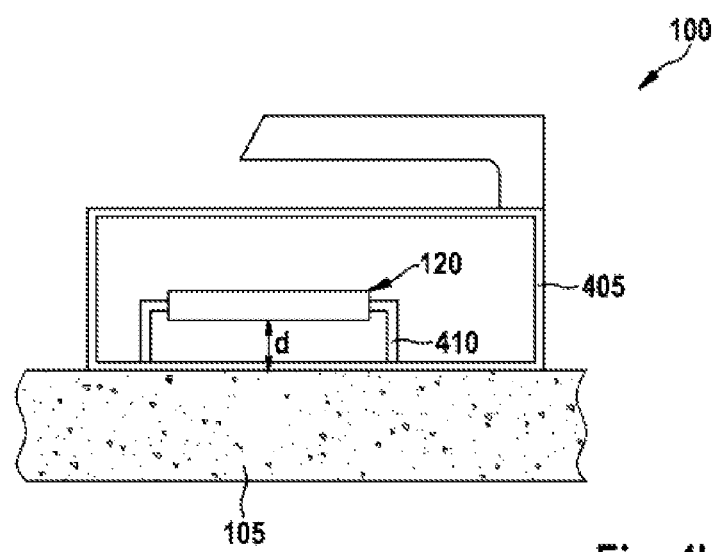

FIGS. 4a and 4b show two different embodiments of a locating appliance 100 as shown in FIGS. 1a and 1b, in each case with an arrangement 120 of electrodes as described above with reference to FIG. 2.

FIG. 4a shows a first embodiment of the locating appliance 100, comprising a housing 405, on the underside of which the arrangement 120 of electrodes is attached. The remaining components, in particular the evaluation circuit 115 or 178, are not shown here. On the underside of the housing 405 there is/are one or more spacers 410, in order to keep the housing 405, and consequently also the arrangement 120, at a predetermined distance d from the upper surface of the medium 105. The distance d advantageously lies in the second region 320 of FIG. 3, ideally at the distance d1.

FIG. 4b shows an alternative embodiment, which is based on the embodiment from FIG. 4a. Here, however, the arrangement 120 is not arranged directly on the underside of the housing 405, but is attached to or provided in the housing 405 in such a way that the predetermined distance d is obtained when the underside of the housing 405 is placed onto the upper side of the medium 105. In this case, the housing may be closed on its underside and the arrangement 120 of electrodes be fastened to the housing 405, so that the housing 405 itself serves as the spacer 410. In another embodiment, a dedicated spacer 410 may be provided within the housing 405 for fastening the arrangement 120 with respect to the housing 405.

The invention claimed is:

1. A locating appliance for the capacitive detection of an object enclosed in a medium, comprising:
   a measurement electrode arranged in a plane with a reception electrode, the measurement electrode and the reception electrode configured to form a measurement capacitance that is influenced by the object;
   a reference electrode, the reference electrode and the reception electrode configured to form a reference capacitance that is not influenced by the object;
   an evaluation circuit configured to provide an output signal on the basis the measurement capacitance and the reference capacitance; and
   a spacer configured to hold the measurement electrode and the reception electrode at a predetermined minimum distance, other than zero, from the surface of the medium, the predetermined minimum distance being a distance at which the output signal is at one of a minimum and a maximum, independent of whether the object is present,
   wherein the measurement electrode, the reception electrode, and the reference electrode are arranged in common plane.

2. The locating appliance as claimed in claim 1, wherein the reception electrode is ungrounded.

3. The locating appliance as claimed in claim 1, wherein the evaluation circuit is configured to provide the output signal on the basis of a ratio between the measurement capacitance and the reference capacitance.

4. The locating appliance as claimed in claim 3, wherein the ratio is proportional to a quotient of (i) a difference between the measurement capacitance and the reference capacitance and (ii) a sum of the measurement capacitance and the reference capacitance.

5. The locating appliance as claimed in claim 3, wherein the evaluation circuit comprises:
   an oscillator configured to supply the measurement electrode and the reference electrode with phase-shifted AC voltages;
   a control device configured to control the amplitude of one of the phase-shifted AC voltages; and
   a determining device configured to provide a control signal for the control device in order to match the influences of electrical fields from the measurement electrode and the reference electrode on the reception electrode to one another,
   wherein the output signal is provided on the basis of the control signal.

6. The locating appliance as claimed in claim 1, further comprising:
   a shielding electrode connected to a constant potential and arranged on a side of the common plane that is averted from the object such that the shielding electrode at least partially covers the measurement electrode, the reception electrode, and the reference electrode.

7. The locating appliance as claimed in claim 1, further comprising:
   a housing,
   wherein the spacer is integrated in the housing.

8. The locating appliance as claimed in claim 1, wherein the predetermined minimum distance is at least 5 mm.

9. A locating appliance for the capacitive detection of an object enclosed in a medium, comprising:
- a measurement electrode arranged in a plane with a reception electrode, the measurement electrode and the reception electrode configured to form a measurement capacitance that is influenced by the object;
- a reference electrode, the reference electrode and the reception electrode configured to form a reference capacitance that is not influenced by the object;
- an evaluation circuit configured to provide an output signal on the basis of a ratio between the measurement capacitance and the reference capacitance; and
- a spacer configured to hold the measurement electrode and the reception electrode at a predetermined minimum distance, other than zero, from the surface of the medium, the predetermined minimum distance being a distance at which the output signal is at one of a minimum and a maximum, independent of whether the object is present,
- wherein the measurement electrode, the reception electrode, and the reference electrode are arranged in common plane.

* * * * *